United States Patent [19]

Zanzig et al.

[11] Patent Number: 5,504,140
[45] Date of Patent: Apr. 2, 1996

[54] TIRE WITH TREAD OF ELASTOMER COMPOSITION

[75] Inventors: David J. Zanzig, Uniontown; Paul H. Sandstrom, Tallmadge; John J. A. Verthe, Kent; Raymond R. DiRossi, Akron; Gregory M. Holtzapple, Kent, all of Ohio

[73] Assignee: The Goodyear Tire & Rubber Company, Akron, Ohio

[21] Appl. No.: 315,476

[22] Filed: Sep. 30, 1994

[51] Int. Cl.$^6$ ................ C08L 9/00; C08L 9/06; C08L 7/00
[52] U.S. Cl. ............. 524/526; 525/236; 525/237
[58] Field of Search ................ 525/236, 237, 525/233, 235; 524/526; 152/209 R

[56] References Cited

U.S. PATENT DOCUMENTS

| | | | |
|---|---|---|---|
| 4,414,363 | 11/1983 | Akita et al. | 525/236 |
| 5,087,668 | 2/1992 | Standstrom et al. | 525/236 |
| 5,191,021 | 3/1993 | Halasa et al. | 525/237 |
| 5,254,653 | 10/1993 | Halasa et al. | 525/236 |
| 5,317,062 | 5/1994 | Rodgers et al. | 525/236 |
| 5,405,927 | 4/1995 | Hsu et al. | 525/237 |

*Primary Examiner*—Paul R. Michl
*Assistant Examiner*—Olga Asinovsky
*Attorney, Agent, or Firm*—Henry C. Young, Jr.

[57] ABSTRACT

Pneumatic rubber tire with a tread composed of a rubber blend of a base of at least two synthetic elastomers composed of (i) specialized isoprene/butadiene copolymer elastomer having a low Tg in a range of about −70° to about −100° C. and (ii) a diene based elastomer having a Tg in a range of about −5° to about −30° C. together with a minor amount of natural cis 1,4-polyisoprene rubber. Selection of the base of the said two synthetic elastomers having spaced apart, or spatially defined, Tg's of at least 40° C. is an important feature of the tread rubber blend. Representative examples of contemplated elastomers with Tg's in a range of about −5° to about −30° C. are 3,4-polyisoprene elastomer, styrene/isoprene copolymer elastomer and high vinyl polybutadiene elastomers.

In one aspect, the tread rubber blend is reinforced with reinforcing filler composed of carbon black or a combination of carbon black and silica accompanied by a coupling agent.

18 Claims, No Drawings

TIRE WITH TREAD OF ELASTOMER COMPOSITION

FIELD

This invention relates to a pneumatic rubber tire with a tread composed of a rubber blend of a base of at least two synthetic elastomers composed of a (i) of specialized isoprene/butadiene copolymer rubber having a Tg in a range of about −70° to about −100° C. and (ii) a diene based elastomer having a Tg in a range of about −5° to about −30° C. together with a minor amount of natural cis 1,4-polyisoprene rubber.

Selection of the base of the said two synthetic elastomers having spaced apart, or spatially defined, Tg's of at least 40° C. is an important feature of the tread rubber blend.

Representative examples of such elastomers with Tg's in a range of −5° to −30° C. are 3,4-polyisoprene elastomer, styrene/isoprene copolymer elastomer and high vinyl polybutadiene elastomers.

In one aspect, the tread rubber blend is reinforced with reinforcing filler composed of carbon black or a combination of carbon black and silica accompanied by a coupling agent.

BACKGROUND

Pneumatic rubber tires are conventionally prepared with a rubber tread which are typically composed of a blend of elastomers.

It is often desired for the rubber composite for the tread to be designed to provide an optimum of traction, treadwear and/or rolling resistance properties for the tire, depending somewhat upon the intended use for the tire.

This invention is primarily directed to passenger vehicle tires where it is desired for the tire tread to have good traction on the road, good treadwear as the tire is used in service and relatively low rolling resistance for vehicular fuel economy.

It is well recognized that if it is desired to particularly enhance one of the above three tire tread properties, often one or more of the other two properties are often somewhat reduced or are otherwise often compromised. A suitable balance of such properties is considered herein as being difficult or not readily achievable with a single elastomer in a tire tread so that, therefore, a blend of elastomers is conventionally used for such purpose.

Various diene-based elastomers, including individual polymers of isoprene and butadiene and copolymers thereof either with each other and with vinyl aromatic materials such as, for example, styrene, have been used in various tire tread compositions. For example, cis 1,4-polyisoprene, 3,4-polyisoprene cis 1,4-polybutadiene, styrene/butadiene copolymer and isoprene/butadiene copolymer elastomers have been used in various combinations in tire tread compositions.

Isoprene/butadiene elastomers have been used or suggested for use in various rubber compositions for tire treads. For example, see U.S. Pat. No. 5,294,663. Isoprene/butadiene elastomers can be made with a wide range of glass transition temperatures depending upon the microstructure, such as for example, from about −10° to about −100° C. In general, the more vinyl, or 1,2- units, and/or 3,4-polyisoprene content, in the copolymer the higher its Tg.

Where it is desired to promote a reduction in rolling resistance and improved treadwear for a tire tread, an isoprene/butadiene copolymer elastomer having a very low Tg in a range of, for example, about −70° to about −100° C. is considered herein to be more beneficial than an isoprene/butadiene elastomer with a higher Tg temperature range. However, such copolymer elastomer, as compared to a similar copolymer elastomer having a higher Tg in a range of about −30° to −50° C. is considered to present a compromise in a traction property for the tire tread. Such isoprene/butadiene copolymer elastomer with the substantially lower Tg temperature range may be sometimes referred to herein as a "low Tg IBR".

Such an isoprene/butadiene copolymer elastomer having a Tg in a range of about −75° to about −90° C., has previously been suggested for use in a tire tread composition composed of such elastomer, cis 1,4-polyisoprene natural rubber and, optionally, styrene/butadiene copolymer rubber.

It is considered herein that cis 1,4-polyisoprene natural rubber typically has a Tg of about −65° C. and that a styrene/butadiene copolymer elastomer containing about 5 to about 30 percent styrene would be expected to have a Tg in a range of about −40° to about −70° C. depending primarily on the styrene content.

Therefore, such low Tg IBR, natural rubber, and styrene/butadiene elastomers have somewhat comparable Tg's in an overall range of about −40° to about −90° C. It is considered herein that these three rubbers would be substantially compatible in a sense of a compounded rubber blend exhibiting a single Tg or a relatively broad Tg as compared to a multiplicity of Tg's.

While it is recognized that various tires have heretofore been provided, or proposed, with rubber tread composed of various elastomers, including the aforesaid elastomers, it is desired to provide a tire with a rubber tread of novel elastomer blend.

The glass transition temperatures, or Tg's referred to herein, represent the glass transition temperatures of the respective elastomers in their uncured, uncompounded state. A Tg can be suitably determined by a differential scanning calorimeter at a temperature rate of increase of 1° C. per minute.

DISCLOSURE AND PRACTICE OF THE INVENTION

In accordance with this invention, a pneumatic rubber tire is provided having a rubber tread where said tread rubber is comprised of, based on 100 parts by weight of the tread rubber, (A) about 10 to about 50, alternatively about 10 to about 40, phr of natural cis 1,4-polyisoprene rubber and (B) about 50 to about 90, alternatively about 60 to about 90, phr of base synthetic rubbers comprised of (i) about 30 to about 80, preferably about 40 to about 60, phr of a isoprene/butadiene copolymer elastomer having Tg in a range of about −70° to about −100° C. and an isoprene content in a range of about 5 to about 70 percent and (ii) about 5 to about 30, preferably about 10 to about 20, phr of at least one other diene based elastomer having a Tg in a range of about −5° to about −30° C.; wherein the Tg of the said isoprene/butadiene copolymer elastomer is at least 40° C. lower than the Tg of the said other diene based elastomer.

Thereby, in the practice of this invention, a major portion of the elastomer composition of the tire tread is the aforesaid synthetic rubber base comprised of the two said synthetic elastomers, one of which is required to be a low Tg isoprene/butadiene elastomer, having spatially defined Tg's which are required to be at least 40° C. apart and a minor portion of the elastomer composition is natural rubber.

Representative examples of said other diene-based elastomer(s) (ii) are 3,4-polyisoprene elastomer having a 3,4-content in a range of about 40 to about 70 percent and a Tg in a range of about −10° to about −20° C.; styrene/isoprene copolymer elastomer containing about 5 to about 35 percent styrene and having a Tg in a range of about −5° to about −30° C.; high vinyl polybutadiene elastomer having a 1,2-vinyl content in a range of about 60 to about 80 percent and a Tg in a range of about −20° to about −30° C.; and isoprene/butadiene copolymer having a Tg in a range of about −10° to about −30° C.

In the practice of this invention, preferred other synthetic elastomers (ii) are 3,4-polyisoprene, high vinyl polybutadiene and styrene/isoprene copolymer elastomers.

While maintaining the aforesaid base synthetic elastomer composition, it is envisioned herein that the tread rubber composition may contain about 5 to about 30, alternatively about 5 to about 20, phr of at least one additional diene based synthetic elastomer, so long as the said base synthetic elastomer(s) are a majority or at least 50 phr (50 weight percent), of the total of elastomers in the rubber composition. The aforesaid restriction of a spatial Tg limitation of 40° C. is not placed on the additional elastomers.

Such additional synthetic diene based elastomers can be, for example, polymers and copolymers of isoprene and butadiene, other than the aforesaid isoprene/butadiene copolymer having the Tg in a range of about −70° to about −100° C., since such elastomers are presented as additional elastomers, and copolymers of isoprene and/or butadiene with aromatic vinyl compounds selected from styrene and alpha methystyrene.

Representative of such additional synthetic elastomers are, for example, are cis 1,4-polybutadiene, medium vinyl polybutadiene having a vinyl content in a range of about 30 to about 50 percent, isoprene/butadiene copolymers having a Tg in a range of about −30° to about −50° C., styrene/isoprene copolymer elastomers having a Tg in a range of about −5° to about −30 and an isoprene content in a range of about 75 to about 90 percent, epoxidized natural rubber elastomer having an epoxidized equivalent in a range of about 10 to about 50 percent, carboxylated acrylonitrile/butadiene copolymer elastomer having an acrylonitrile content in a range of about 5 to about 50 percent cis 1,4-polybutadiene elastomer having a Tg in a range of about −85° to about −95° C. and styrene/butadiene copolymer prepared by organic solution or by aqueous emulsion polymerization having a Tg in a range of about −15° to about −35 and a styrene content in a range of about 10 to about 50 and styrene/isoprene/butadiene terpolymers.

In practice, it is preferred that the elastomers utilized in the tread composition, including both the other and the additional elastomers, are exclusive of polymers and copolymers of isobutylene, including halogen modifications thereof.

In the practice of the invention preferred additional synthetic elastomers are cis 1,4-polybutadiene, styrene/butadiene copolymers.

Therefore, in further accordance with this invention, a pneumatic tire is provided having a rubber tread, where said tread rubber is comprised of, based on 100 parts by weight tread rubber, (A) about 10 to about 40, alternatively about 15 to about 25, phr of cis 1,4-polyisoprene natural rubber, (B) about 50 to about 85, alternatively about 75 to about 85, phr of said base synthetic elastomers comprised of (i) about 30 to about 80 phr of said isoprene/butadiene copolymer elastomer having a Tg in a range of about −70° to about −100° C. and (ii) about 10 to about 30 phr of at least one other diene based synthetic elastomer having a Tg in a range of about −5° to about −30° C., where the Tg of said isoprene/butadiene elastomer is at least 40° C. lower than the Tg of said other diene based synthetic elastomer and (C) about 5 to about 30, alternatively about 10 to about 20, phr of at least one additional diene based synthetic elastomer.

While is considered that a tire tread rubber is conventionally reinforced with a particulate carbon black reinforcing filler, it is recognized that for some tire applications silica reinforcement of the tread rubber may also be desirably used in combination with the carbon black for the tire tread where the silica is used in a minority amount of reinforcing filler as compared to the use of the carbon black, or alternatively, used in an equal amount or as a majority amount of the silica/carbon black reinforcing filler.

Accordingly, in further accordance with this invention, a pneumatic tire is provided having a rubber tread composed of the aforesaid rubber blend(s) which contains about 30 to about 100 phr, alternatively about 35 to about 60 phr, of carbon black and silica reinforcing fillers where said fillers are composed of (i) about 10 to about 50, alternatively about 10 to about 30 weight percent silica or, (ii) about 50 to about 90, alternatively about 55 to about 90 weight percent silica; and wherein a silica coupling agent is used having a moiety reactive with said silica and a moiety reactive with the carbon to carbon double bonds of at least one of said elastomers.

A tire tread utilizing about 30 to about 60 phr of such fillers might be useful, for example, to promote low rolling resistance for the tire and a tire tread utilizing about 60 to about 100 phr of such fillers might be useful, for example, to promote a good balance of traction and handling for the tire, although such utilities of fillers in the aforesaid ranges might overlap and not always be readily distinguishable. Many of the uses of the various filler contents are known to those skilled in such art.

A tire tread utilizing such fillers containing 50 to 90 percent silica might be useful, for example, in high performance tire applications since it would be expected to promote a balance of traction, handling, treadwear and rolling resistance and a tire tread utilizing such fillers containing about 10 to about 30 percent silica might be useful, for example, in tires where rolling resistance is desirable.

It is considered herein that the utilization of the relatively low Tg isoprene/butadiene copolymer rubber is significant, particularly as an aforesaid base synthetic elastomer in required combination with the said 3,4-polyisoprene elastomer and, further, is a departure from utilizing an isoprene/butadiene copolymer elastomer having a considerably higher Tg in a range of about −40° to about −50° C. in a tire tread composition because it is considered herein that the use of the substantially lower Tg isoprene/butadiene copolymer elastomer promotes improved, or lower, rolling resistance for the tire and thereby better fuel economy for the vehicle.

However, it is considered herein that using the isoprene/butadiene copolymer elastomer with the relatively low Tg instead of the isoprene/butadiene copolymer elastomer with the substantially higher Tg in a tire tread rubber composition would normally be considered to be a disadvantage by compromising tread traction. However, the utilization thereof in a truck tire tread rubber composition might not be such a disadvantage because traction promoting for elastomer selection is not such an issue for trucks which carry substantially heavier loads than passenger cars.

Accordingly, it is considered that a significant aspect and contribution of this invention is to utilize the low Tg isoprene/butadiene copolymer elastomer in a tire tread rubber composition to promote a relatively low rolling resistance for the tire in combination with the 3,4-polyisoprene elastomer with its comparatively high Tg.

Introduction of the 3,4-polyisoprene elastomer is considered herein to promote the traction that the said low Tg isoprene/butadiene copolymer elastomer, as compared to a similar high Tg copolymer elastomer, is considered to compromise.

In one aspect, it is important that the Tg's of the respective synthetic elastomers are spatially defined, namely that they differ by at least 40° C.

In this manner, it is considered herein that the said low Tg isoprene/butadiene elastomer is relatively incompatible with the other elastomers in a sense that the compounded rubber composition would be expected to exhibit at least two Tg's. This is considered significant because, for the compounded rubber, it is considered herein that the relatively lower Tg peak for the isoprene/butadiene copolymer elastomer would suggest a promotion of lower rolling resistance and the relatively higher Tg represented by the 3,4-polyisoprene elastomer would suggest a promotion of higher traction than a similar rubber composition exhibiting a single Tg or a relatively broad Tg range without definitive dual Tg peaks.

The microstructure of the low Tg isoprene/butadiene copolymer elastomer contemplated for use in this invention is considered a very low 1,2-butadiene (vinyl) and 3,4-isoprene content. For example, for such a copolymer contemplated for use in this invention, with an isoprene content of 30 percent and a Tg of about −83° C., would be expected to contain about 62 percent 1,4-butadiene, 8 percent 1,2-butadiene, 28 percent 1,4-isoprene and 2 percent 3,4-isoprene.

The low Tg isoprene/butadiene copolymer elastomer for the base elastomer composition of this invention preferably has a microstructure comprised of about 1 to about 10 percent 3,4-structure, based on its polyisoprene content, about 2 to about 10 percent vinyl 1,2-structure, based on its polybutadiene content and wherein the total of said 3,4-isoprene and vinyl contents is in a range of about 3 to about 12.

Utilization of the 3,4-polyisoprene elastomer with the prescribed Tg in considered important to promote traction and handling for the tire tread. The 3,4-polyisoprene elastomer can be readily prepared, for example, see U.S. Pat. No. 5,087,668.

The addition of the cis 1,4-polyisoprene natural rubber is considered important to contribute to tear resistance property for the tread rubber composition and the processing of the rubber composition such as in the mixing together of its various components.

The commonly employed siliceous pigments used in rubber compounding applications are usually precipitated siliceous pigments (referred to herein as silica).

The siliceous pigments employed may be precipitated silicas such as, for example, those obtained by the acidification of a soluble silicate, e.g., sodium silicate.

The BET surface area of the silica, as measured using nitrogen gas, may, for example, be a range of about 50 to about 300, alternatively about 120 to about 200, square meters per gram. A BET method of measuring surface area is described in the *Journal of the American Chemical Society*, Volume 60, page 304 (1930).

The silica may also have a dibutylphthalate (DBP) absorption value in a range of about 100 to about 400, and usually about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243, etc; silicas available from Rhone-Poulenc, with designations of Z1165MP and Z165GR and silicas available from Degussa AG with designations VN2 and VN3, etc.

When quantitative silica reinforcement is used for a rubber tire tread, the silica is conventionally used with a coupling agent, or what is sometimes referred to as a reinforcing agent.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber, such as for example, silane coupling agents containing a polysulfide component, or structure, such as bis-(3-triethoxysilylpropyl) tetrasulfide.

It is readily understood by those having skill in the art that the rubber compositions of the tread would be compounded with conventional compounding ingredients including the aforesaid reinforcing fillers such as carbon black, including, for example, N110, N299 and N351 carbon blacks silica typically in combination with a silica coupling agent, as well as antidegradant(s), processing oil, stearic acid or a zinc stearate, zinc oxide, sulfur-contributing material(s) and vulcanization accelerator(s).

Such compounding of rubber is well known to those having skill in such art. Antidegradants are typically of the amine or phenolic type while stearic acid is typically referred to as a rubber compounding ingredient, it may be pointed out that the ingredient itself is usually obtained and used as a mixture of organic acids primarily composed of stearic acid with at least one of oleic acid, linolenic acid and palmitolic and/or palmitic acid. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, rubber processing oil such as paraffinic, napthenic and aromatic processing oils typically used in the range of about 2 to about 10 phr; waxes such as microcrystalline and paraffinic waxes typically used in a range of about 1–5 phr and often in a range of about 1 to about 3 phr; and resins, usually as tackifiers, such as, for example, synthetic hydrocarbon and natural resins typically used in a range of about 1–5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to 5 phr and usually in a range of about 0.5 to about 3 phr; and the accelerator(s), often of the sulfenamide type, is (are) used in a range of about 0.5 to about 3 phr and often in a range of about 1 to about 2 phr. The term "phr" refers to parts by weight of the referenced ingredient per one hundred parts by weight of rubber in the rubber composition. Such term is commonly used in the rubber compounding art.

After mixing, the compounded rubber can be fabricated into a tire tread and cured under conditions of heat and pressure by methods well-known to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of diene rubbers compositions were prepared comprised of recipes shown in Table 1 as Experiments A, B, C and D. Experiment A is considered a control and Experiments B, C and D utilize blends of, variously, low Tg isoprene/butadiene copolymer and 3,4-polyisoprene.

TABLE 1

| | Parts | | | |
|---|---|---|---|---|
| Material | Exp A (Control) | Exp B | Exp C | Exp D |
| Natural rubber (cis 1,4-polyisoprene) | 30 | 30 | 30 | 30 |
| Isoprene/butadiene rubber[1] (70/30) | 0 | 60 | 0 | 0 |
| Isoprene/butadiene rubber[2] (50/50) | 0 | 0 | 60 | 0 |
| Isoprene/butadiene rubber[3] (30/70) | 0 | 0 | 0 | 60 |
| S-SBR[4] | 60 | 0 | 0 | 0 |
| 3,4-polyisoprene[5] | 10 | 10 | 10 | 10 |
| Carbon black, N299 | 35 | 35 | 35 | 35 |
| Silica[6] | 8 | 8 | 8 | 8 |
| Silica coupler[7] | 2 | 2 | 2 | 2 |
| Processing oil (paraffinic) | 7 | 7 | 7 | 7 |

Conventional, preferred, amounts of paraffinic rubber processing oil, antidegradant(s) (para-phenylene diamine type), tackifying resin, fatty acid, zinc oxide, peptizer, sulfur and accelerator of the sulfenamide type were used.

1. An isoprene/butadiene copolymer rubber—prepared by neodymium catalysis characterized by reportedly having an isoprene content of about 70 percent, and a Tg of about −79° C., wherein its Mooney viscosity (ML 1+4) at 100° C. was 76.
2. An isoprene/butadiene copolymer rubber—prepared by neodymium catalysis characterized by reportedly having an isoprene content of about 50 percent, and a Tg of about −90° C., wherein its Mooney viscosity (ML 1+4) at 100° C. was 82.
3. An isoprene/butadiene copolymer rubber prepared by neodymium catalysis—characterized by reportedly having an isoprene content of about 30 percent, and a Tg of about −98° C., wherein its Mooney viscosity (ML 1+4) at 100° C. was 82.
4. An organic solution polymerization prepared styrene/butadiene copolymer rubber reportedly having a styrene content of about 18 percent, a vinyl content of about 10 percent, a Tg of about −78° C., and a Mooney viscosity (ML 1+4) of 85.
5. Elastomer containing 50 percent 3,4-isoprene units with Tg of −16° C.
6. Hi-Sil 210 from PPG Industries.
7. A composite of bis-(3-triethoxysilylpropyl) tetrasulfide and carbon black in a 50/50 ratio obtained as X50S from Degussa.

EXAMPLE II

The prepared rubber compositions were cured at a temperature of about 150° C. for about 18 minutes and the resulting cured rubber samples evaluated for their physical properties (rounded numbers are reported herein) as shown in the following Table 2. The samples A, B, C and D correspond to the experimental samples A, B, C and D of Example I.

TABLE 2

| Properties | Ex. A Control | Ex B | Ex C | Ex D |
|---|---|---|---|---|
| DIN abrasion (cm³ loss) | 81 | 63 | 37 | 29 |
| Rebound (%) at 23° C. (Zwick) | 55 | 59 | 62 | 63 |
| Rebound (%) at 100° C. (Zwick) | 71 | 74 | 75 | 76 |
| Ult. Elongation (%) | 379 | 497 | 446 | 410 |
| 300% Modulus, MPA | 9.2 | 7.8 | 8.2 | 8.6 |
| Tensile Strength, MPA | 11.6 | 14.2 | 12.8 | 12.2 |

Observation of the above physical properties of the rubber composites show or suggest that significant improvements in tire rolling resistance and tread wear can be achieved by using the low Tg isoprene/butadiene copolymer elastomer in combination with natural rubber and 3,4-polyisoprene rubber as evidenced by having a lower DIN abrasion (volume loss) value and higher rebound values. These properties were observed to improve as the butadiene content in the isoprene/butadiene copolymer increases.

EXAMPLE III

Tires of size P195/70R14 were prepared with rubber treads of the rubber compositions of Exp. X and Y, with recipe preparations similar to Exp. A and D, respectively, of Example I as illustrated in Table 3. Exp X is considered a control. The tires are tested with results normalized to 100 for the control tire (Ex. X) and shown in Table 4.

TABLE 3

| Material | Exp X (Control) | Exp Y |
|---|---|---|
| Isoprene/butadiene rubber[1] | 0 | 60 |
| S-SBR rubber[2] | 30 | 0 |
| Natural rubber | 55 | 28 |
| 3,4-polyisoprene rubber[3] | 15 | 12 |
| Carbon black, (N299) | 40 | 40 |
| Silica[4] | 10 | 15 |
| Coupler[5] | 2 | 3 |

Conventional, preferred, amounts of paraffinic rubber processing oil, antidegradant(s), waxes, fatty acid (stearic acid), zinc oxide, peptizer, sulfur and accelerators of the sulfenamide and thiuram disulfide types were used.

1. An isoprene/butadiene copolymer elastomer prepared by organolithium catalysis, containing 30 percent isoprene with 28 percent 1,4-structure, 2 percent 3,4-structure, and containing 70 percent butadiene with 62 percent 1,4-structure, and 8 percent 1,2-structure, and reportedly having a Tg of −83° C. and a Mooney viscosity (ML 1+4) of about 88 at 100° C.
2. An organic solution polymerization prepared styrene/butadiene copolymer containing 12 percent styrene, a Tg of 45° C. and a Mooney viscosity (ML1+4) at 100° C. of about 90.
3. Elastomer containing 50 percent 3,4-isoprene units with Tg of −16° C.
4. Hi-Sil 210 from PPG Industries.
5. Degussa X50S.

TABLE 4

| | Tire | |
|---|---|---|
| Property | Ex. X (Control) | Ex. Y |
| Treadwear Rating | 100 | 144 |
| Wet Skid Resistance | 100 | 98 |
| Rolling Resistance Rating | 100 | 110 |

These results show that significant improvements in rolling resistance and treadwear are obtained by utilizing the low Tg isoprene/butadiene copolymer elastomer in the tread rubber composition in place of a more conventional styrene/butadiene copolymer elastomer. Utilization of the 3,4-polyisoprene elastomer in combination with the low Tg isoprene/butadiene copolymer elastomer maintained an acceptable traction rating for the tire.

The values for the control tire is provided herein as normalized to a value of 100. The values presented herein for the experimental tire are determined by multiplying the ratio of the average value for the experimental tire over the value for the control tire and the resulting number multiplied by 100. A higher reported value means a better tire performance.

The rolling resistance was determined by mounting the tire on a metal rim, inflating it and running it, under a load, on a dynamometer using a 67 inch diameter drum. Measurements were made at tire inflation pressure 38 psi and loading of 908 pounds. A 6 inch metal rim was used for the tire. A higher reported value for the rolling resistance means a lower, or improved, rolling resistance which may translate into better fuel economy for the vehicle.

The wet traction rating can be determined by a tire industry accepted traction trailer test. A lower reported value means less traction, or skid resistance. While, generally, a higher value is preferred, it is considered that the difference between the reported value for the Exp. Y tire tread and the control Exp X tire tread is relatively insignificant.

Treadwear can be measured by mounting tires on metal rims and mounting the resultant wheel assembly on a vehicle and the vehicle run for at least about 20,000 miles and the difference in tread groove depth measured. The value is extrapolated to determine a treadwear rating. A higher value means longer tread life.

While certain representative embodiments and details have been shown for the purpose of illustrating the invention, it will be apparent to those skilled in this art that various changes and modifications may be made therein without departing from the spirit or scope of the invention.

What is claimed is:

1. A rubber tire having a rubber tread where said tread rubber is comprised of, based on 100 parts by weight of the tread rubber, (A) about 10 to about 50 phr of natural cis 1,4-polyisoprene rubber and (B) about 50 to about 90 phr of base synthetic rubbers comprised of (i) about 30 to about 80 phr an elastomer copolymer of essentially isoprene and butadiene having Tg in a range of about −70° to about −100° C. and an isoprene content in a range of about 5 to about 70 percent and (ii) about 5 to about 30 phr of at least one other diene based elastomer having a Tg in a range of about −5° to about −30° C.; wherein the Tg of the said copolymer of isoprene and butadiene elastomer is at least 40° C. lower than the Tg of the said other diene based elastomer; and where said other diene based elastomer is selected from at least one of styrene/isoprene copolymer elastomer containing about 5 to about 30 percent styrene and having a Tg in a range of about −5° to about −30° C.; high vinyl polybutadiene elastomer having a 1,2-vinyl content in a range of about 60 to about 80 percent and a Tg in a range of about −20° to about −30° C.; and elastomer copolymer essentially of isoprene and butadiene having a Tg in a range of about −10° to about −30° C., and wherein the said elastomers utilized in the tread composition are exclusive of polymers and copolymers of isobutylene.

2. The pneumatic tire of claim 1 where said tread rubber is comprised of, based on 100 parts by weight tread rubber, (A) about 15 to about 25 phr cis 1,4-polyisoprene natural rubber, (B) about 50 to about 85, phr of said base synthetic elastomers comprised of (i) about 30 to about 80 phr of said isoprene/butadiene copolymer elastomer having a Tg in a range of about −70° to about −100° C. and (ii) about 5 to about 30 of at least one other diene based synthetic elastomer having a Tg in a range of about −5° to about −30° C., where the Tg of said isoprene/butadiene elastomer is at least 40° C. lower than the Tg of said other diene based synthetic elastomer and (C) about 5 to about 30 phr of at least one additional diene based synthetic elastomer; where said other diene based synthetic elastomer is selected from styrene/isoprene copolymer elastomer containing about 5 to about 30 percent styrene and having a Tg in a range of about −5° to about −30° C.; high vinyl polybutadiene elastomer having a 1,2-vinyl content in a range of about 60 to about 80 percent and a Tg in a range of about −20° to about −30° C.; and isoprene/butadiene copolymer having a Tg in a range of about −10° to about −30° C., and wherein the said elastomers utilized in the tread composition are exclusive of polymers and copolymers of isobutylene.

3. The tire of claim 2 where, in said tread, said additional elastomers (C) are elastomer(s) selected from at least one of polymers and copolymers of isoprene and butadiene, other than the aforesaid isoprene/butadiene copolymer having the Tg in a range of about −70° to about −100° C., and copolymers of isoprene and butadiene with aromatic vinyl compounds selected from styrene and alpha methystyrene, and wherein the said elastomers utilized in the tread composition are exclusive of polymers and copolymers of isobutylene.

4. The tire of claim 3 where, in said tread, said additional elastomers (C) are elastomer(s) selected from at least one of cis 1,4-polybutadiene, medium vinyl polybutadiene having a vinyl content in a range of about 30 to about 50 percent, isoprene/butadiene copolymers having a Tg in a range of about −30° to about −50° C., styrene/isoprene copolymer elastomers having a Tg in a range of about −5 to about −30 and an isoprene content in a range of about 75 to about 90 percent, epoxidized natural rubber elastomer having an epoxidized equivalent in a range of about 10 to about 50 percent, carboxylated acrylonitrile/butadiene copolymer elastomer having an acrylonitrile content in a range of about 5 to about 50 percent, cis 1,4-polybutadiene elastomer and styrene/butadiene copolymer prepared by organic solution or by aqueous emulsion polymerization having a Tg in a range of about −15 to about −35 and a styrene content in a range of about 10 to about 50 and styrene/isoprene/butadiene terpolymers.

5. The tire of claim 3 where said additional elastomer (C) is at least one elastomer selected from 1,4-polybutadiene, styrene/butadiene copolymers and isoprene/butadiene copolymers.

6. The pneumatic tire of claim 1 which contains a total of about 30 to about 100 parts of carbon black and silica reinforcing fillers where such fillers are composed of about up to about 90 weight percent silica; and wherein a silica coupling agent is used having a moiety reactive with the silica and a moiety reactive with the carbon to carbon double bonds of one or more of said elastomers.

7. The tire of claim 6 wherein the silica coupling agent is bis-(3-triethoxysilylpropyl)tetrasulfide.

8. The tire of claim 6 wherein the silica is present in the said reinforcing fillers in an amount of about 10 to about 45 percent.

9. The tire of claim 6 wherein the silica is present in the said reinforcing fillers in an amount of about 10 to about 30 percent.

10. The tire of claim 6 wherein the silica is present in the said reinforcing fillers in an amount of about 55 to about 90 percent.

11. The pneumatic tire of claim 2 which contains a total of about 30 to about 100 parts of carbon black and silica reinforcing fillers where such fillers are composed of about up to about 90 weight percent silica; and wherein a silica coupling agent is used having a moiety reactive with the silica and a moiety reactive with the carbon to carbon double bonds of one or more of said elastomers.

12. The tire of claim 2 wherein the silica coupling agent is bis-(3-triethoxysilylpropyl)tetrasulfide.

13. The tire of claim 11 wherein the silica is present in the said reinforcing fillers in an amount of about 10 to about 45 percent.

14. The tire of claim 11 wherein the silica is present in the said reinforcing fillers in an amount of about 10 to about 30 percent.

15. The tire of claim 11 wherein the silica is present in the said reinforcing fillers in an amount of about 55 to about 90 percent.

16. The tire of claim 1 wherein the microstructure of the isoprene/butadiene copolymer for the base elastomer composition is comprised of about 1 to about 10 percent 3,4-structure, based on its polyisoprene content, about 2 to about 10 percent vinyl 1,2-structure, based on its polybutadiene content, wherein the total of said 3,4-isoprene and vinyl contents is in a range of about 3 to about 12, and wherein the said elastomers utilized in the tread composition are exclusive of polymers and copolymers of isobutylene.

17. The tire of claim 2 wherein the microstructure of the isoprene/butadiene copolymer for the base elastomer composition is comprised of about 1 to about 10 percent 3,4-structure, based on its polyisoprene content, about 2 to about 10 percent vinyl 1,2-structure, based on its polybutadiene content, wherein the total of said 3,4-isoprene and vinyl contents is in a range of about 3 to about 12, and wherein the said elastomers utilized in the tread composition are exclusive of polymers and copolymers of isobutylene.

18. The tire of claim 11 wherein the microstructure of the isoprene/butadiene copolymer for the base elastomer composition is comprised of about 1 to about 10 percent 3,4-structure, based on its polyisoprene content, about 2 to about 10 percent vinyl 1,2-structure, based on its polybutadiene content, wherein the total of said 3,4-isoprene and vinyl contents is in a range of about 3 to about 12, and wherein the said elastomers utilized in the tread composition are exclusive of polymers and copolymers of isobutylene.

* * * * *